April 19, 1932.                E. E. SORRELL                1,854,527
        ADJUSTABLE WING AND STABILIZATION CONTROL FOR AEROPLANES
                    Filed Dec. 16, 1929      2 Sheets-Sheet 1
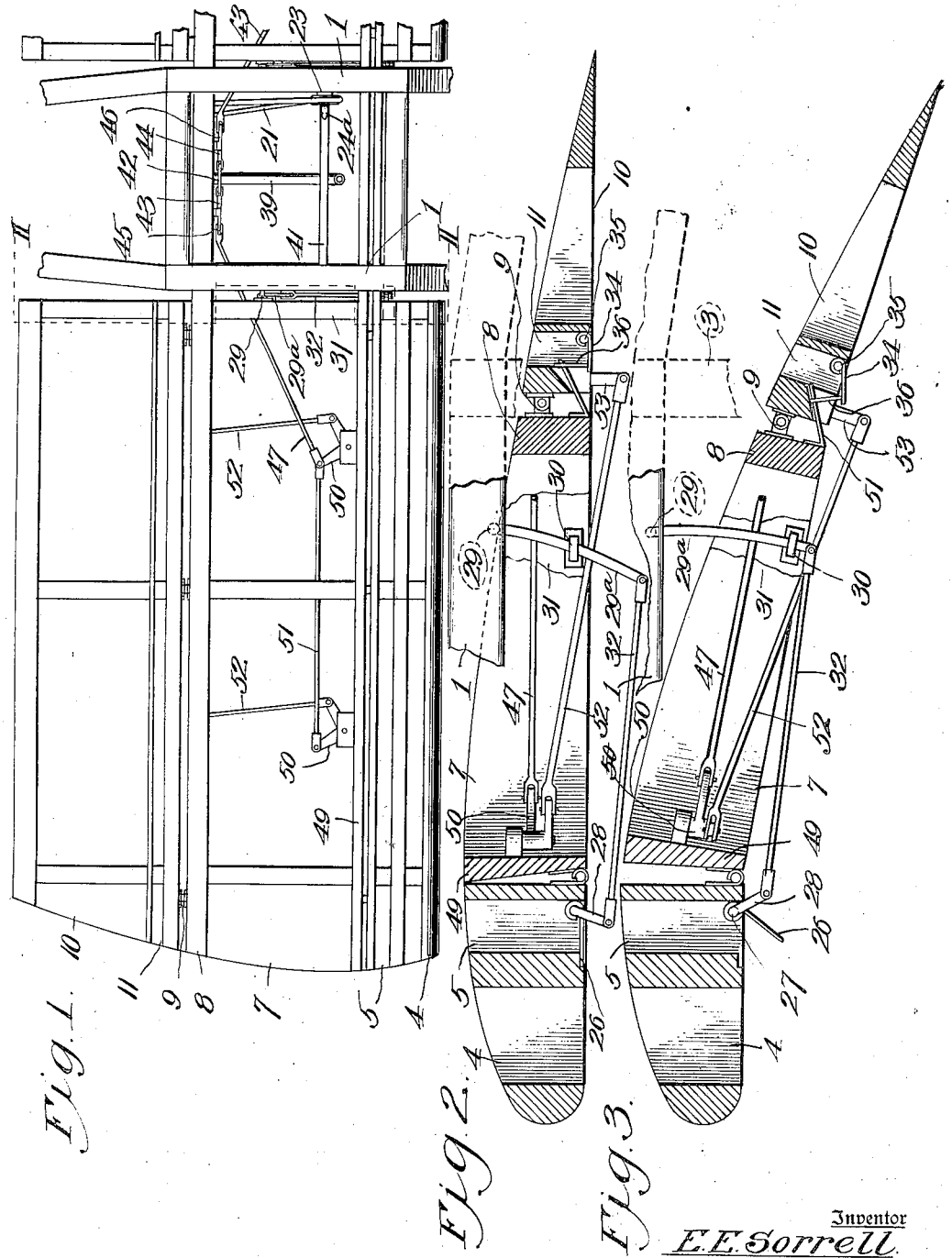
Inventor
E. E. Sorrell
By Thorpe Thorpe
Attorneys

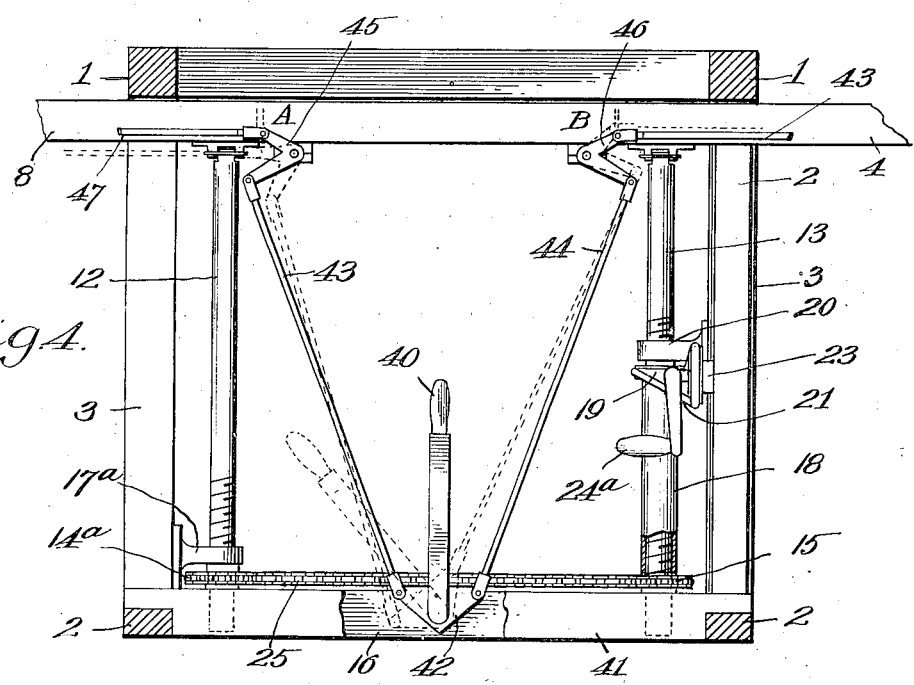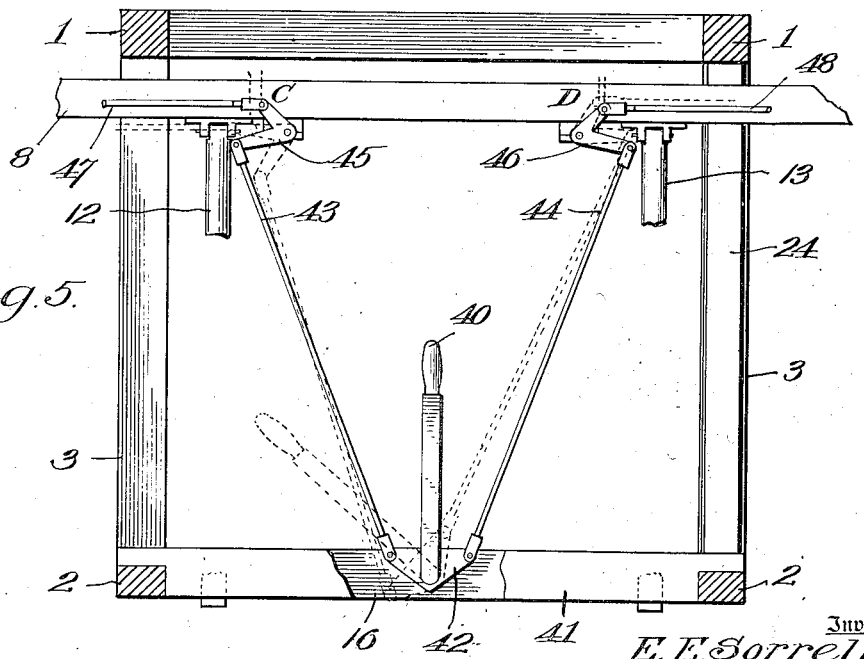

Patented Apr. 19, 1932

1,854,527

UNITED STATES PATENT OFFICE

ERNEST E. SORRELL, OF SPRINGFIELD, MISSOURI

ADJUSTABLE WING AND STABILIZATION CONTROL FOR AEROPLANES

Application filed December 16, 1929. Serial No. 414,477.

This invention relates to aeroplanes and more particularly to control mechanism therefor whereby the curvature of the wings or angle of incidence may be varied at the will of the operator of the machine, whereby the lift may be increased at the time of taking off by effecting a greater curvature of the supporting surfaces, said greater curvature also being useful to decrease the forward speed when the aeroplane is coming to a landing.

A still further object is to provide an adjustable curved wing whereby after the aeroplane has left the ground, the operator may gradually flatten out the wing to decrease its resistance to translation through the air to compensate for gasoline and oil consumption and the like, thus allowing or compensating for loss of weight and effecting a gain in efficiency in flight.

Another object of the invention is to provide for differential movement of the ailerons used for maintaining stability. As the ailerons normally extend below the horizontal it will be obvious that there is greater air resistance in forcing an aileron downwardly than there is in moving it upwardly. The control mechanism of the invention provides means whereby the aileron moving upwardly against the smaller resistance and being assisted for a part of its movement by the air pressure against the under side of the aileron, moves a greater distance in the same time than the aileron on the opposite wing which is moving downwardly. Thus some of the physical strain or effort on the pilot is removed.

A still further object of the invention is to provide a differential aileron movement as above described which is automatically adjusted in accordance with the degree of curvature of the sustaining wings, whereby when the wing is moved from a relatively flat to a curved position, the ailerons on the opposite wings, while retaining their differential movement as above referred to, will move a greater distance for a corresponding adjustment of the stability control lever, it being apparent that at high speed a slighter adjustment of the ailerons will quickly stabilize the plane, while at low speed the ailerons must be adjusted a relatively greater distance in order to effect the same compensation.

A still further object of the invention is to provide slotted wing construction whereby the slots are automatically closed when the plane is flying at its highest speed and with the wings in their flatted position of adjustment, but which will automatically open in accordance with an increase in curvature of the wing to increase the lift on the wing at such time.

A still further object of the invention is to provide wing flaps or valves which act as funnels in directing air through the wing slots when such flaps are in open position, the flaps being opened progressively in accordance with the curvature of the wing, their greatest opening movement being at the time the wing has the greatest curvature and consequently the least forward speed. With all types of flaps or wing slots with which I am familiar, the plane as a whole must be tipped to a predetermined degree of incidence before the wing slots will operate. With the construction in the adjustable wing and flap construction of the invention, the aeroplane fuselage is always held in a plane parallel with the line of flight and the wing itself is adjusted rather than adjusting the entire aeroplane as is now common practice.

A still futher object of the invention is to provide a slotted wing construction having a valve or flap for closing the mouth of the slots to maintain the streamline effect of the under side of the wing when the wing is in its flattest position and prevent air resistance due to bubbling or the like underneath the wing in close proximity to the mouth of the slots. With all aeroplane slotted wing constructions with which I am familiar, the slots controlling valve is at the exit of the wing slots leaving the opening at the under side of the wing open which effects a drag on such under surface of the wing as will be readily apparent.

With the general objects named in view and others as will hereinafter appear, reference is to be had to the accompanying drawings, in which:

Figure 1 is a top plan view of an aeroplane and fuselage construction in skeleton form equipped with control apparatus embodying the invention.

Figure 2 is a section on an enlarged scale taken on the line II—II of Figure 1 with the aeroplane wing being shown in its flattest or high speed position.

Figure 3 is a view similar to Figure 2 but with the aeroplane wing adjusted to increase the angle of incidence.

Figure 4 is an enlarged section taken through the fuselage with the wings broken away to illustrate the control mechanism of the invention.

Figure 5 is a view similar to Figure 4 with the aeroplane wing adjusted to curved form and with certain parts omitted.

In the said drawings, where like reference characters identify corresponding parts in all of the figures, 1 indicates the upper longitudinal parallel members of the fuselage of an aeroplane, 2 the lower parallel members, and 3 the corner posts, it being understood of course that the fuselage is indicated somewhat diagrammatically and that the constructional details may be varied at will. Oppositely projecting from the forward upper corner of the fuselage are the entering edges 4 of the aeroplane wings, each entering edge being provided with a wing slot 5 and being fixed in position with reference to the fuselage.

Pivotally connected to the longitudinal girder of the entering edge or front wing section is the main or central section 7 of the aeroplane wing, said central section being formed at its rear end with a beam 8 extending for the full length of the aeroplane and preferably passing transversely through the fuselage so that the pair of wings of the aeroplane may be simultaneously adjusted by control of the position of the beam 8 as will hereinafter appear. Pivotally connected as at 9 to the beam 8 are ailerons 10 which preferably extend for the full length of the middle section of the wing, said ailerons being provided with a slot 11 for increasing the lift of the ailerons as will hereinafter appear.

The curvature of the wing, through mechanism, hereinafter described, is controlled by the vertical adjustment of a pair of posts 12 and 13 which are pivotally connected as at 14 to the under side of the beam 8. The lower ends of the posts 12 and 13 are in threaded engagement with sprocket wheels 14a and 15 respectively, the lower ends of said posts passing through and being guided by the rear lower cross beam 16 of the fuselage. The sprocket wheel 14a is held against upward movement by a bracket 17 carried by a vertical post of the fuselage. The other sprocket wheel 15 is held in position by a tubular sleeve 18 encircling the threaded post and bearing at its upper end against a pulley 19, the entire assembly being held against upward movement by a bracket 20 corresponding to the bracket 17 on the left hand side of the machine. The pulley 19 is threaded on the post 13 and is encircled by a belt 21 which also encircles a drive pulley 22 journaled on a shaft 23 extending from a vertical post 24 mounted between the upper and lower members of the fuselage. The pulley shaft 23 is equipped with a suitable manual or power drive crank arm 24a. It will be apparent that upon rotation of the crank arm the pulley 19 on the threaded post 13 will be rotated, and, depending on the direction of rotation, will move said post upwardly or downwardly, such motion being transmitted to the sprocket wheel 15 which through a sprocket chain 25 transmits corresponding movement to the sprocket wheel 14 of the post 12, it being evident that this mechanism will raise or lower the beam 8 and will correspondingly affect the position of the central section of the wing, this downward movement of the beam 8, referring to Figures 4 and 5, simultaneously lowering the centers of certain pivoted links 47 and 48 by moving them inwardly and upwardly in an arc, the inward movement being transmitted to bell cranks 50 and link 51, which in turn through links 52 and arm 53, pull the aileron 10 downwardly below central section 7 to form a continuation in the curves of the wings. The links and bell crank levers just recited also form a part of the aileron control as will be hereinafter described. When the wing is down the curvature is greater and the lift is increased. When the wing is up, it is in its normal flying position and offers the least resistance to translation of the aeroplane as will be readily understood.

Although the valves or flaps for the wing slots in the construction as illustrated are equipped with automatic mechanism for varying the opening movement, it will be apparent that manual control may be applied to said wing slots if desired. The automatic mechanism for effecting the opening of the slots in accordance with the position of adjustment of the beams 8 forming the rear edges of the central section is as follows: 26 illustrates a flap for closing the front slot 5, said flap being keyed to a shaft 27 extending longitudinally of the wing and being formed at its inner end adjacent the fuselage with a crank arm 28. Journaled on a shaft 29 carried by the outside face of the upper beams of the fuselage, is a downwardly projecting cam member 29a, the curvature of which controls the amount or degree of opening movement of the forward flaps as will hereinafter appear, said cam extending through a loop 30 permanently secured to one of the transverse girders 31 of the aeroplane wing, the lower end of said cam being pivotally connected by a link 32 to the crank arm 28 of the shaft 27. Referring to Figures 2 and 3, it will be apparent that when the beam 8 is adjusted downwardly, the loop 30 will force the cam arm 29a rearwardly and effect consequent pulling movement of the link to open the slot in accordance with the adjustment or angle of incidence given the wing of the plane.

The aileron slot 11 is controlled by a flap or valve 34 which is pivotally connected to a shaft 35 extending for the full length of the aileron and at suitable points the flap at its front edge is provided with an upstanding portion 36 provided with an opening slidingly receiving a cam arm 37 permanently secured to a beam 38 forming the rear edge of the central section of the wing. Referring to Figures 2 and 3 it will be apparent that as the wing is curved, the flap 34 will be opened by the cam member 37 secured to the rear edge or beam of the central section in accordance with the degree of angular adjustment of the aileron.

In order to control the position of the ailerons, the following mechanism is provided: 39 illustrates a shaft extending longitudinally of the fuselage and in a central position between the wings, equipped at any suitable point with an operating handle 40, said shaft being journaled at its rear end in the bottom rear cross member of the fuselage and at its front end being journaled in an auxiliary cross frame member 41 of the fuselage, said auxiliary cross frame member being broken away in Figures 4 and 5 to more clearly illustrate certain operating attachments on said shaft. Adjacent its rear end and vertically below the cross beam 8 when in adjusted position, is a cross arm 42 to which a pair of upwardly-diverging links 43 and 44 are pivoted, it being noted that the pivotal point of the links on the cross arm are above the axis of the shaft 39 in order that differential movement may be imparted to the ailerons as will hereinafter appear. Journaled to the wing frame beam 8 are a pair of bell crank levers 45 and 46 each having one arm pivotally connected to the links 43 and 44 respectively and having their other arms pivotally connected to links 47 and 48 which extend into the wings of the plane.

Secured to the front beam member 49 of the central section of the wings are a plurality of bell crank levers 50, the number required being dependent upon the size of the wings and the safety factor. All of said bell crank levers are connected by links 51, the bell crank lever arm adjacent the fuselage being also connected to the free end of its respective link 43 or 44. The other arms of each of the bell crank levers 50 are connected by links 52 to downwardly projecting arms 53 permanently secured to the front beam member 54 of the aileron. Referring to Figure 4 and bearing in mind the connections just described, it will be apparent that upon the rotation of the shaft 39 to the dotted line position shown in said figure, the link 48 controlling the aileron of the left wing will move inwardly through a distance B, and the link 47 controlling the right aileron will move outwardly a distance represented by the space indicated by A in said Figure 4. In other words, the control mechanism gives the ailerons a differential movement, the aileron moving upwardly traveling a greater distance than the aileron moving downwardly, thus relieving the operator of some of the physical effort necessary to force an aileron downwardly against wind pressure as will be readily understood. At flying speed it is not necessary to adjust the aileron through a very large range as a slight adjustment quickly compensates for any inequality in balance, but at slower speed when the wing is curved as when landing or the like, it will be readily apparent that a greater surface must be offered to the air to have the same compensating effect as a smaller surface at high speed.

Therefore referring to Figure 5 it will be noted that when the beam 8 controlling the curvature of the wing is adjusted downwardly the centers of the pivoted ends of the links 47 and 48 will be moved upwardly in an arc to the position shown in said figure. Now, upon adjustment of the shaft 39 to the same degree as in Figure 4, the pivotal points of the links 47 and 48 respectively will move outwardly and inwardly distances represented by D and C, these distances being greater than the distances A and B of Figure 4. It will be evident that by proper proportioning of the bell crank levers and links, that any reasonable range of differential movement may be readily attained both when the wings are flat and when the wings are curved, and that this differential movement will always be in exact proportion to the position of the beam of the center section of the wing.

From the above description it will be apparent that while I have produced a device possessing all of the features of advantage set forth as desirable, it is to be understood that I reserve the right to make all such changes or modifications as permissible in view of the state of the prior art.

I claim:

1. The combination with the fuselage of an aeroplane, of a wing extending from said fuselage and composed of a plurality of sections, the front section of said wing being rigidly connected to said fuselage and the other sections being hingedly connected in tandem relation to said front section, connections for adjusting said pivoted wing sections from a relatively flat to a relatively curved position, and means independent of said connections for pivotal operation of the rearmost wing section, said means being capable of adjusting the rearmost section to a greater arc when the wing is curved than when the wing is relatively flat.

2. An aeroplane having a pair of wings constructed in sections, control mechanism for varying the degree of curvature of said aeroplane wings, ailerons attached to the rear edges of said wings, and control connections for simultaneously moving one aileron upwardly a greater distance than the other aileron moves downwardly, said control mechanism being automatically adjusted in predetermined relation to the position of curvature of said wing, whereby the movement of the ailerons is greater when the wing is curved.

In testimony whereof I affix my signature.

ERNEST E. SORRELL.